United States Patent [19]

Kishi et al.

[11] Patent Number: 4,841,432
[45] Date of Patent: Jun. 20, 1989

[54] METHOD OF RECONFIGURATION OF STORAGE AREAS IN AN APPARATUS FOR CHEATING NC TAPES

[75] Inventors: Hajimu Kishi, Hino; Takashi Takegahara, Hachioji; Masashi Yukutomo, Sagamihara, all of Japan

[73] Assignee: Fanuc Ltd., Minamitsuru, Japan

[21] Appl. No.: 145,739

[22] Filed: Jan. 19, 1988

Related U.S. Application Data

[63] Continuation of Ser. No. 444,591, Nov. 17, 1982, abandoned.

[30] Foreign Application Priority Data

Mar. 30, 1981 [JP] Japan ................................ 56-047047

[51] Int. Cl.$^4$ ............................................. G06F 15/46
[52] U.S. Cl. ...................................... 364/191; 364/900
[58] Field of Search ... 364/200 MS File, 900 MS File, 364/191, 192, 193, 193, 474.01

[56] References Cited

U.S. PATENT DOCUMENTS

| | | | |
|---|---|---|---|
| 3,593,315 | 7/1971 | Patel | 364/200 |
| 3,596,257 | 7/1971 | Patel | 364/200 |
| 3,639,912 | 2/1972 | Campbell | 364/200 |
| 3,675,215 | 7/1972 | Arnold et al. | 364/200 |
| 3,816,723 | 6/1974 | Slawson | 364/200 |
| 3,967,248 | 6/1976 | Kjoller et al. | 364/200 |
| 4,037,211 | 7/1977 | Ikuta et al. | 364/200 |
| 4,075,694 | 2/1978 | Ericsson | 364/200 |
| 4,075,694 | 2/1978 | Friesson | |
| 4,121,286 | 10/1978 | Venton et al. | 364/200 |
| 4,189,773 | 2/1980 | O'Meara | 364/300 |
| 4,198,681 | 4/1980 | Furr, Jr. | 364/200 |
| 4,366,536 | 12/1982 | Kohn | 364/200 |
| 4,403,283 | 9/1983 | Myntti et al. | 364/200 |

FOREIGN PATENT DOCUMENTS 0002750  7/1979  European Pat. Off. .

OTHER PUBLICATIONS

Tanenbaum, A., "Operating Systems Design and Implementation," Prentice-Hall, 1987, pp. 198-200.
Donald E. Knuth, The Art of Computer Programming, vol. 1, Fundamental Algorithms, 1968, Addison-Wesley Publishing Company, pp. 435-451.
Harvey M. Deitel, An Introduction to Operating Systems, 1984, Addison-Wesley Publishing Company, pp. 157-174.
Yamatani Masami, "Kaso Kioku System Nyumon", Oct. 10, 1978 (10.10.78), The Ohm-Sha; Ltd., pp. 10-11.
(2) Kiokuiki no Compaction (storage compaction) PCT International Application (WO-A-8 002 610).

Primary Examiner—Gareth D. Shaw
Assistant Examiner—Jonathan C. Fairbanks
Attorney, Agent, or Firm—Staas & Halsey

[57] ABSTRACT

In an apparatus wherein a memory is subdivided into plural storage areas, and predetermined data are adapted to be written into respective ones of the storage areas, a method of reconfiguring the storage areas of the memory. The leading addresses of the respective storage areas and the sizes of blank portions of the respective storage areas are stored while it is discriminated whether a blank portion exists in a predetermined one of the storage areas. When there is no blank portion or substantially no blank portion in the predetermined storage area, the blank portions of the remaining storage areas are reduced in size on the basis of the leading addresses and the sizes of the blank portions. The predetermined storage area is enlarged by an amount equal to the amount of blank portion reduction effected in the remaining areas.

9 Claims, 3 Drawing Sheets

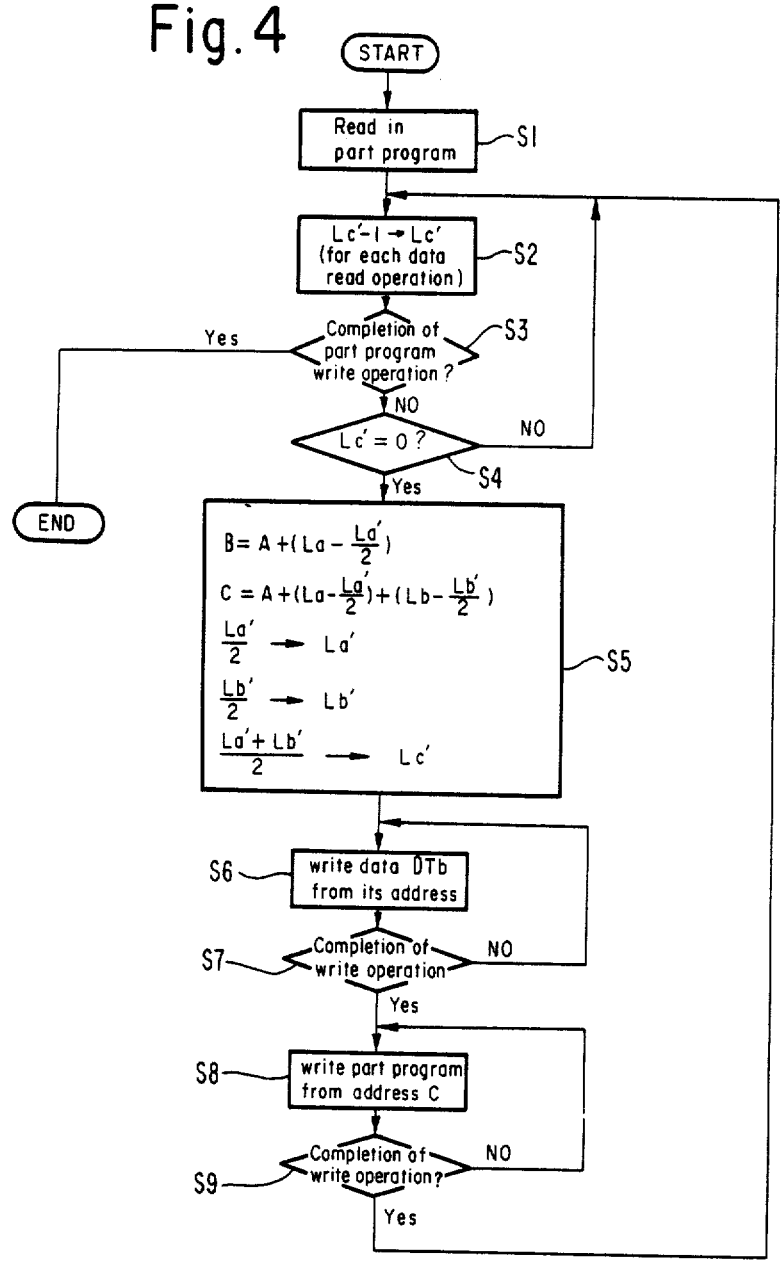

METHOD OF RECONFIGURATION OF STORAGE AREAS IN AN APPARATUS FOR CHEATING NC TAPES

This is a continuation of co-pending application Ser. No. 444,591 filed on Nov. 17, 1982, now abandoned.

DESCRIPTION

BACKGROUND OF THE INVENTION

This invention relates to a method of reconfiguring the storage areas of a memory and, more particularly, to a method applicable to an apparatus wherein a memory is subdivided into plural storage areas and predetermined data are written into respective ones of the subdivided memory areas. In the method of reconfiguring the storage areas, it is discriminated whether a blank portion exists in a predetermined one of such storage areas. When there are no blank portions or substantially no blank portions in the predetermined storage area, the blank portions of the remaining storage areas are reduced in size whereas the predetermined storage area is enlarged in size by an amount corresponding to the reduction effected in the remaining storage areas.

For realizing high-speed processing through the use of a low cost apparatus or system, it is important to make the best use of the storage areas of a fixed capacity memory device, such as a main memory, to dispense with any special external memory. The necessity for such effective utilization of resources is equally important for a small-size apparatus with a built-in microcomputer, to say nothing of a large-scale computer system, especially in view of the fact that the manufacturing costs of a small-size apparatus depend primarily on the memory capacity.

An example of such a processing apparatus is an apparatus for automatically creating machining programs (NC tapes) for controlling machine tools.

Usually, NC machine tools are operated as instructed by a machining program recorded on an NC tape for machining a workpiece in a desired manner. These NC tapes are prepared by introducing, from drawings of the workpiece, the totality of the numerical data necessary for machining, such as size or feed rate data and other machining conditions, by punching the paper tape in accordance with predetermined rules. When machining workpieces by NC machine tools, the NC tapes are loaded in a tape reader of the NC apparatus for sequentially reading out the commands recorded on the NC tapes. These commands are then executed to carry out the machining operation in the desired manner. These NC tapes, consisting of paper tapes on which the data have been recorded by punching, can be prepared only with considerable time and skill. In recent years, a device for automatically creating NC tapes has been devised and put into practical use. These automatic devices are provided with a graphic display, keyboard and printer and are extremely useful because they permit the simple creation of NC tapes promptly and accurately. These devices make use of a computer, the software designed for preparation of the NC tape (system program) is stored in an enclosed main memory.

The system programs designed for preparation of the NC tapes are variable with machining modes, such as turning, 2½-axis milling, 3-axis milling, punching, wire-cut electric discharge machining, and so forth. The memory capacity would be voluminous if these system programs for the respective machining modes are to be stored in the main memory, thus raising the costs of the device. Moreover, the system programs designed for all of the machining modes are not necessarily required by all users. Thus, the system programs are stored separately in magnetic cassette tapes, and the system programs are entered from these cassette tapes into the main memory as the occasion may demand.

In preparing the machining program, it is necessary to prepare a group of data describing the tool counter movements (part program) in accordance with predetermined rules and to input the data group into the main memory while storing the predetermined system program simultaneously in the main memory. In the case of milling, these data groups may be composed of tool radius data, part surface data defining the radial component of the tool movement, drive surface data defining the axial component of the tool movement, and stop surface data defining the limit of tool movement when the tool is moved along both the part surface and drive surface. The above data are the graphic data representing part shape or the like. The data groups are further composed of the start position data for the contouring movement and the data for commanding the contouring movement, these two being the command data for tool movement.

When a part program has been entered, the automatic NC tape creating device operates to make use of the part program to automatically create a machining program under control of the system program, to store the resulting machining program in the main memory and to punch the paper tape for preparation of the NC tape.

Hence, the storage area of the main memory is subdivided into an area for storing the basic system program, an area for storing an optional system program, an area for storing a part program, and one or more areas (working areas) for storing a machining program to be created and various data such as graphic data necessary for preparation of the NC tape. FIG. 1 shows diagrammatically the various areas of the main memory 101, specifically a basic system program area BSP, an optional system program area OSP (hereafter referred to as file No. 4), two working data areas $NCP_1$, $NCP_2$ (hereafter referred to as file Nos. 2 and 3), respectively) and a part program area PPA (hereafter referred to as file No. 1). Only one working data area or three or more working data areas may be provided if so desired.

In the conventional automatic NC tape creating devices, the basic program area BSP and the respective files (PPA, $NCP_1$, $NCP_2$) have been fixed in the main memory 101 and have predetermined sizes. Hence, the part program may not be accomodated in the file No. 1 (PPA) for certain sizes of the part program, or the machining program to be created may not be accommodated in the file No. 2 ($NCP_1$) or the file No. 3 ($NCP_2$) even if the part program can be accommodated in the file No. 1 (PPA). In such cases, the device is no longer in a position to prepare and execute the machining program despite the remaining area still having blank portions in which to store the excess data. In other words, in the conventional NC tape creating devices, the processing must be discontinued when a certain area or areas (such as files Nos. 1 through 3) are full of data despite the remaining areas having a sufficient blank portion. Thus, continued operation must be assured by enlarging the capacity of the memory 101 by making use of an external memory, resulting in higher manufacturing costs.

SUMMARY OF THE INVENTION

Accordingly, it is an object of the present invention to provide a method of reconfiguring storage areas in which the storage area of the main memory is utilized effectively to eliminate the need for enlarging the memory capacity of the main memory or the need for using an external memory, and which can be produced at reduced cost and lends itself to high-speed processing.

This object of the present invention may be realized by discriminating, in an apparatus wherein a memory is subdivided into plural storage areas and predetermined data are written into respective ones of the subdivided storage areas, whether a blank portion exists in a predetermined one of such storage areas and by reducing, when there are no blank portions or substantially no blank portions in the predetermined storage area, the size of the blank portions of the remaining areas, while enlarging the predetermined storage area by an amount equal to the amount of blank portion reduction effected in the remaining areas.

BRIEF DESCRIPTION OF THE DRAWINGS

FIG. 3 is a schematic diagram of a file No. 1 which is full of data and incapable of receiving a part program during entry of the part program, wherein FIG. 3 illustrates the file being reconfigured; and FIG. 4 is a flow chart for realizing the file reconfiguration.

DESCRIPTION OF THE PREFERRED EMBODIMENTS

For a detailed description of the present invention, a preferred embodiment of the invention is described in detail by referring to the accompanying drawings.

According to the present invention, the respective files (PPA, NCP$_1$ and NCP$_2$) and basic system program area (BSP) are fixed in advance, but may be reconfigured when one of these files in full of data and any blank portion exists in the remaining files. Thus a file control program (hereafter referred to as FCP) is included in the basic system program and, whenever any one file is full, the reconfiguration of the respective files is carried out under control of the FCP for optimizing the lengths of the respective files.

Figure 1:
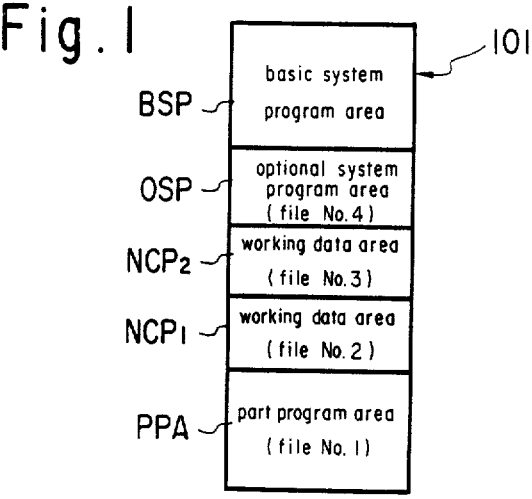
FIG. 1 is a schematic diagram of the storage areas of a main memory.
Figure 2:
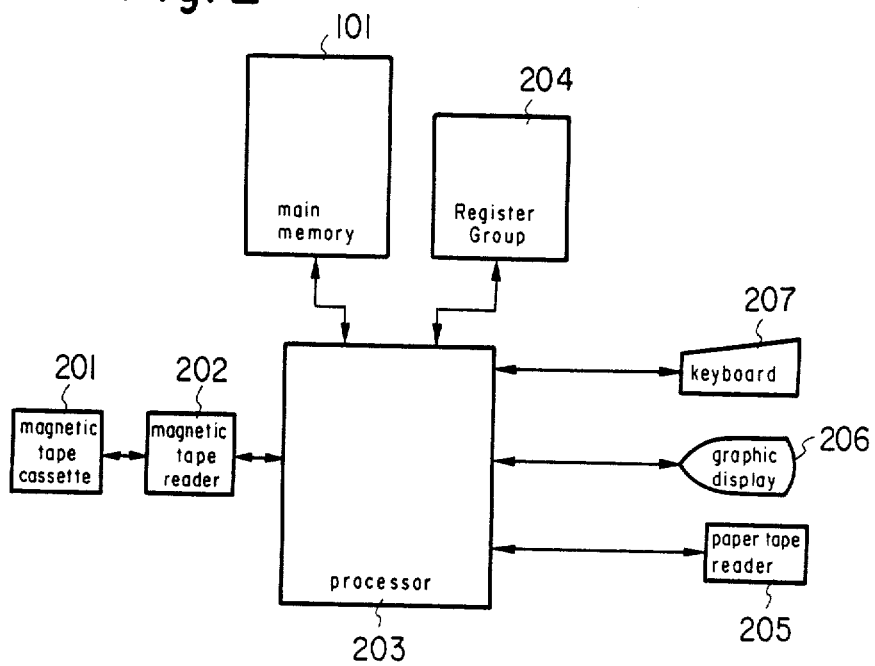
FIG. 2 is a block diagram of a device for automatically creating an NC tape.

FIG. 2 is a block diagram of the automatic NC tape creating device designed for practicing the present invention. In the drawing, numeral 101 designates a main memory formed by a random access memory (RAM) and constituted as shown in FIG. 1. Numeral 201 designates a magnetic tape cassette on which a system program for NC tape preparation is recorded in advance and which is comprised of an initial program loader record section and a system program record section. The initial program loader record section stores a loading program while the system program record section stores the system program necessary for preparation of the NC tape. Numeral 202 designates a magnetic tape reader for reading out the data recorded on the tape cassette 201. Numeral 203 designates a data processor such as a microprocessor and numeral 204 a group of registers designed for storing the first or leading addresses of the files PPA, NCP$_1$ and NCP$_2$ making up the main memory 101, the size of these files and the number of blank addresses. Numeral 205 designates a paper tape reader/puncher, numeral 206 a graphic display and numeral 207 a keyboard.

In the operation of the NC tape creating device, upon actuation of a start switch (not shown) the loading program is read out by the magnetic tape reader 202 from the initial program loader record section of the magnetic tape cassette 201, and is stored in the main memory 101. Then, the system program stored in the system program record section of the magnetic tape cassette 201 is written into the system program area BSP (see FIG. 1) of the main memory 101 by means of this loading program. Following termination of the above operation, the NC tape can be created by entering the part program.

Figure 3:
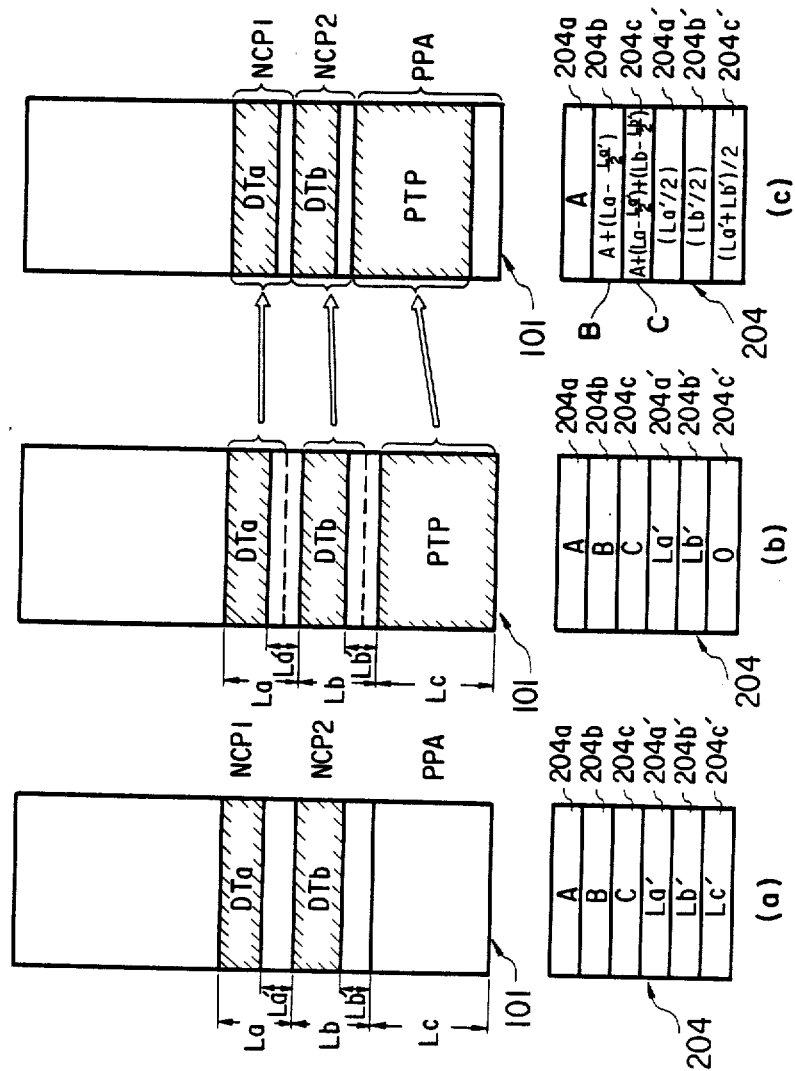

FIGS. 3 and 4 are a schematic diagram and a flow chart for explaining the steps to be taken when a file No. 1 has been completely filled with data while the part program is being written into the file, making it impossible to fit the entire part program into the file. Thus, FIGS. 3 and 4 are a schematic diagram and a flow chart for illustrating file reconfiguration, respectively.

Referring to FIGS. 3 and 4, numeral 101 designates the main memory with the file No. 1 (PPA), file No. 2 (NCP$_1$) and file No. 3 (NCP$_2$) as shown. The file No. 2 has La-number of addresses starting from an address A and contains data DTa in (La-La')-number of addresses. The file No. 3 has Lb-number of addresses starting from an address B (B=A+La) and contains data DTb in (Lb-Lb')-number of addresses, while the file No. 1 has Lc-number of addresses starting from an address C (C=A+La+Lb). Numeral 204 designates the group of registers for storing leading addresses of the respective files and the size of blank portions. Thus, the leading addresses A, B and C are stored in the registers 204a to 204c, whereas the size of the blank portions La', Lb', Lc' of the respective files PPA, NCP$_1$ and NCP$_2$ are stored in the registers 204a' to 204c'.

In the state shown in FIG. 3(a), the part program starts to be written from the magnetic cassette tape 201 (FIG. 2) into file No. 1 (PPA) (Step S1 in FIG. 4). The part program data is read out item-by-item sequentially and written into file No. 1 (PPA). Each time one data item is written into the file No. 1, an operation $$Lc' - 1 \rightarrow Lc' \qquad (1)$$

is carried out by an arithmetic unit of the processor (Step S2 in FIG. 4).

When the Lc-number of data items have been read out from the part program and written into the file No. 1 (PPA), Lc' is equal to zero (Step S4 in FIG. 4) and the file No. 1 (PPA) is completely filled with data FIG. 3(b). With the file No. 1 (PPA) thus filled with data, the files are reconfigured. Thus, the sizes of the blank portions of the file No. 2 (NCP$_1$) and file No. 3 (NCP$_2$) are reduced to La'/2 and Lb'/2, respectively, and the file No. 1 (PPA) is enlarged correspondingly, while the storage locations of the part program PTP already stored in the file No. 1 (PPA) and those of the data DTb stored in the file No. 2 are changed. Thus, the operations $$A+(La-La'/2) \rightarrow B \qquad (2)$$

$$A+(La-La'/2)+(Lb-Lb'/2) \rightarrow C \qquad (3)$$

are carried out to determine the leading address B of the file No. 2 (NCP$_1$) and the leading address C of the file No. 1 (PPA). Also, the operations $$La'/2 \rightarrow La' \quad (4)$$

$$Lb'/2 \rightarrow Lb' \quad (5)$$

$$(La' + Lb')/2 \rightarrow Lc' \quad (6)$$

are carried out to determine the sizes of the blank portions of the respective files (Step S5 in FIG. 4). The data B, C, La', Lb' and Lc' are stored in the registers 204b, 204c, 204a', 204b' and 204c', respectively. The data DTb stored in the old file No. 2 are written into the new file No. 2 starting from its new leading address (Steps S6 and S7 in FIG. 4), and finally the part program stored in the old file No. 1 is written into the new file No. 1 starting from its new leading address (Steps S8 and S9 in FIG. 4) to complete the file reconfiguration FIG. 3(c). The remaining portions of the part program are then written in accordance with a sequence of operations similar to that described above.

It may be seen from the foregoing that the lengths of the files Nos. 1 through 3 may be optimized as long as the sum of the part program data and the data DTa, DTb is less than the total capacity of the file Nos. 1 through 3, and that the part program and the data DTa, DTb can be stored in the respective files in this manner. It should be noted that while the above description has dealt with a case where the part program is written into the file No. 1 (PPA), a storage area reconfiguration operation similar to that described above may be carried out when the file Nos. 2 and 3 have become completely filled with data while the working data are being stored, as they are being produced, in these files during creation of the machining program based on the system program and part program. Thus, the optimum lengths for respective files can be determined automatically provided that, after entering the part program, a machining program is created on the basis of the part program, and the machining program is executed.

In the foregoing, part programs are stored in advance in the file No. 1 of the main memory. However, a machining program may also be created when the part program data are not previously stored in file No. 1 but are entered sequentially through a keyboard or like input device. In this case, file No. 1 is not used or, in other words, is blank in its entirety. (More specifically, the file has a length α which is a minimum length necessary for the file to exist as a file). Therefore, when file No. 2 or No. 3 is full, the length of the new file No. 2 or No. 3 can be increased through the sequence of operations mentioned above. It should be noted that the part program is not entered in file No. 1 by an NM designation from the keyboard.

In the foregoing, file No. 4 (optional system program area) has been disregarded. When the optional function is not used during preparation of the machining program or when the optional function has been used and then is no longer necessary, the storage area may be reconfigured as described above with file No. 4 taken into consideration, that is, with file No. 4 considered as a blank area. Since file No. 4 is always blank in this case, the lengths of the files Nos. 1, 2 and 3 can be enlarged correspondingly. It is to be noted that predetermined file enlarging statements may be used in the part program for enlargement up to the file No. 4.

The present invention is not limited to the above embodiment which has been illustrated in detail with reference to the accompanying drawings. By way of example, flowcharts other than that shown in FIG. 4 may be employed. Although a case has been described where the blank portions of files other than one filled with data are halved in size, the file length need not be halved but can be reduced to m/n where m < n. In addition, while the present invention has been described above in connection with a device for automatically creating NC tapes, this does not constitute a limitation of the invention.

According to the present invention, the storage area of a main memory can be utilized effectively to eliminate the necessity for enlarging the storage capacity and enabling low-cost, high-speed processing.

Furthermore, the execution of a part program results in an optimum reconfiguration of the storage area, and there is no need to perform re-editing processing at the time of subsequent execution of the same part program.

What is claimed is:

1. In an apparatus for automatically creating NC tapes for controlling machine tools wherein a memory is subdivided into plural storage areas, wherein each of the subdivided storage areas has the capability of being divided into a blank portion and a data portion, and wherein predetermined data are written into respective ones of the subdivided storage areas, a method of reconfiguring the subdivided storage areas of the memory comprising the steps of:
   (a) discriminating whether a blank portion exists in a predetermined one of the subdivided storage areas;
   (b) reducing, when there is no blank portion, or substantially no blank portion, in the predetermined one of the subdivided storage areas, the size of the blank portions of the remaining ones of the subdivided storage areas; and
   (c) enlarging the predetermined one of the subdivided storage areas by an amount equal to the amount of blank portion reduction effected in the remaining ones of the plural storage areas.

2. A method of reconfiguring storage areas according to claim 1, wherein said steps (b) and (c) are performed by storing the leading addresses of the subdivided storage areas, storing the respective sizes of the blank portions of the subdivided storage areas and processing the stored leading addresses and the stored respective sizes of the blank portions to determine whether to reduce or enlarge the subdivided storage areas.

3. A method of reconfiguring storage areas according to claim 2, wherein the apparatus for automatically creating an NC tape uses a control program including control data, a part program defining contouring movements of tools, and a machining program formulated on the basis of the control program and the part program, and wherein the subdivided storage areas are designed to store the control data for the control program used for the creation of the NC tape, the part program and the machining program.

4. A method of reconfiguring storage areas according to claim 1, wherein said step (b) comprises reducing the sizes of the blank portions of the remaining ones of the subdivided storage areas by half.

5. A method of reconfiguring the assignment of storage areas in a memory of an apparatus for automatically creating NC tapes for controlling machine tools, the memory being subdivided into storage areas assigned to respective files, each of the storage areas having the capability of being divided into an unused portion and a data portion, data relating to the files being written into the corresponding respective ones of the storage areas, said method comprising the steps of:

(a) determining whether an unused portion of the storage area assigned to a predetermined one of the files, exists;

(b) reducing the size of the unused portions of the remaining storage areas when it is determined that there is no unused portion of the storage area corresponding to the predetermined one of the files; and (c) enlarging the storage area corresponding to the predetermined one of the files, by an amount equal to the reduction of the storage areas corresponding to the remaining ones of the files.

6. A method of reconfiguring storage areas according to claim 5, wherein each of the storage areas is defined by a leading address and by size data indicating the size of the unused portion of the storage area assigned to the corresponding one of the files, and wherein said step (b) comprises storing the leading addresses of the storage areas and the size data for the storage areas, and processing the leading addresses and the size data to determine the amount by which the storage areas are to be reduced or enlarged.

7. A method of configuring a memory of an apparatus for automatically creating NC tapes for storing a program for controlling machine tools, the memory having first, second and third storage areas into which data corresponding to first, second and third files is written, each of the first, second and third storage areas having the capability of being divided into an unused portion and a data portion, said method comprising the steps of:

(a) determining whether there is an unused portion in the first storage area;

(b) reducing the size of the unused portions of the second and third storage areas when there is no unused portion of the first storage area; and (c) enlarging the first storage area by an amount equal to the reduction of the unused portions in the second and third storage areas.

8. A method of reconfiguring storage areas in a numerical control apparatus wherein a memory is subdivided into plural storage areas and a basic system program for numerical control, an optional system program working data and a part program are stored as files in the respective subdivided storage areas, comprising:

(a) storing a number of addresses of data and a number of blank regions in the files stored in the storage areas, each of the storage areas having the capability of being divided into a blank region and a data region;

(b) discriminating that at least one of the subdivided storage areas has a blank region which is less than prescribed;

(c) when the blank region is discriminated to be less than prescribed in said step (b), dividing the remaining blank regions in the other files in half and setting revised addresses of the files based on the number of data as well as the divided sizes of the blank regions and number of data after division; and (d) restoring one of the files in the corresponding storage area using the revised addresses set in said step (c).

9. A method according to claim 8, wherein said step (d) comprises successively restoring a plurality of the files in the respective storage areas using the revised addresses.

* * * * *

UNITED STATES PATENT AND TRADEMARK OFFICE
CERTIFICATE OF CORRECTION

PATENT NO. : 4,841,432
DATED : JUNE 20, 1989
INVENTOR(S) : HAJIMU KISHI ET AL.

It is certified that error appears in the above-identified patent and that said Letters Patent is hereby corrected as shown below:

FRONT PAGE [54] In the Title, line 3, "CHEATING" should be --CREATING--.

Col. 3, line 33, "ration." should be --ration illustrated in FIG. 3.--.

Col. 4, line 44, "(PPA)." should be --(PPA) (step S3 in FIG. 4).--.

Col. 5, line 19, "FIG. 3(c)" should be --(FIG. 3(c))--.

Col. 8, line 11, "program" should be --program,--.

Signed and Sealed this

Tenth Day of April, 1990

Attest:

HARRY F. MANBECK, JR.

*Attesting Officer*     *Commissioner of Patents and Trademarks*